United States Patent
Hasegawa et al.

(10) Patent No.: US 10,437,060 B2
(45) Date of Patent: Oct. 8, 2019

(54) IMAGE DISPLAY DEVICE AND IMAGE DISPLAY METHOD, IMAGE OUTPUT DEVICE AND IMAGE OUTPUT METHOD, AND IMAGE DISPLAY SYSTEM

(71) Applicant: Sony Corporation, Tokyo (JP)

(72) Inventors: Yuichi Hasegawa, Tokyo (JP); Yasunori Kamada, Kanagawa (JP); Eiichi Tanaka, Chiba (JP)

(73) Assignee: Sony Corporation (JP)

( * ) Notice: Subject to any disclaimer, the term of this patent is extended or adjusted under 35 U.S.C. 154(b) by 204 days.

(21) Appl. No.: 15/031,351

(22) PCT Filed: Dec. 11, 2014

(86) PCT No.: PCT/JP2014/082900
§ 371 (c)(1),
(2) Date: Apr. 22, 2016

(87) PCT Pub. No.: WO2015/107817
PCT Pub. Date: Jul. 23, 2015

(65) Prior Publication Data
US 2016/0246057 A1    Aug. 25, 2016

(30) Foreign Application Priority Data
Jan. 20, 2014   (JP) ................................. 2014-007472

(51) Int. Cl.
*G02B 27/01* (2006.01)
*G09G 5/00* (2006.01)
(Continued)

(52) U.S. Cl.
CPC ....... *G02B 27/0172* (2013.01); *G02B 27/017* (2013.01); *G06T 19/006* (2013.01);
(Continued)

(58) Field of Classification Search
CPC .............. G02B 27/017; G02B 27/0172; G02B 27/0176; G02B 27/0093;
(Continued)

(56) References Cited

U.S. PATENT DOCUMENTS 5,917,460 A * 6/1999 Kodama ............ G02B 27/0093
345/7
7,167,771 B2 * 1/2007 Ito ......................... G02C 7/021
700/182
(Continued)

FOREIGN PATENT DOCUMENTS

JP      2000339490 A    12/2000
JP      2001154144 A    6/2001
(Continued)

OTHER PUBLICATIONS

International Search Report from International Publication No. PCT/JP2014/082900 dated Mar. 17, 2015.

*Primary Examiner* — Priyank J Shah
(74) *Attorney, Agent, or Firm* — Lerner, David, Littenberg, Krumholz & Mentlik, LLP

(57) ABSTRACT

[Object] To provide an image display system that displays an image with a wide field of view while reducing VR sickness. [Solution] When a field of view $FOV_O$ of an original image provided by an image output device (200) is greater than a field of view $FOV_D$ of an image viewed by a user wearing an image display device (300), the image output device (200) cuts out a region with the field of view $FOV_D$ from the original image for delivery to the image display device (300). Also, when the field of view $FOV_O$ of the image viewed by the user wearing the image display device (300) is equal to or greater than the field of view $FOV_D$ of the original image provided by the image output device (200), the image output device (200) delivers the original image as-is to the image display device (300).

20 Claims, 11 Drawing Sheets

(51) Int. Cl.
*G06T 19/00* (2011.01)
*H04N 5/74* (2006.01)
(52) U.S. Cl.
CPC ............ *G09G 5/00* (2013.01); *H04N 5/7491* (2013.01); *G02B 2027/014* (2013.01); *G02B 2027/0118* (2013.01); *G02B 2027/0123* (2013.01); *G02B 2027/0138* (2013.01); *G02B 2027/0147* (2013.01); *G09G 2320/068* (2013.01); *G09G 2340/04* (2013.01); *G09G 2340/14* (2013.01)

(58) Field of Classification Search
CPC ..... G02B 2027/0132–0136; G02B 2027/0174; G02B 2027/0178; G02B 23/0125; G06F 3/012; G06F 3/013; H04N 13/0429–044; H04N 5/7491
See application file for complete search history.

(56) References Cited

U.S. PATENT DOCUMENTS

| | | | | |
|---|---|---|---|---|
| 2003/0073922 | A1* | 4/2003 | Miller | H04N 1/00 600/545 |
| 2007/0262917 | A1* | 11/2007 | Otsuki | G02B 27/017 345/8 |
| 2010/0013739 | A1* | 1/2010 | Sako | G16H 40/63 345/8 |
| 2011/0102558 | A1* | 5/2011 | Moliton | H04N 13/398 348/54 |
| 2011/0273543 | A1* | 11/2011 | Ushio | G02B 27/0172 348/54 |
| 2013/0100511 | A1* | 4/2013 | Yamamoto | G02B 27/017 359/9 |
| 2013/0147686 | A1* | 6/2013 | Clavin | G06F 3/013 345/8 |
| 2014/0320534 | A1* | 10/2014 | Kimura | G06T 11/60 345/634 |
| 2014/0362113 | A1* | 12/2014 | Benson | G02B 27/0172 345/633 |
| 2015/0177829 | A1* | 6/2015 | Sakuta | G06F 3/012 345/156 |
| 2015/0185503 | A1* | 7/2015 | Tate | G06F 3/013 351/158 |
| 2015/0235427 | A1* | 8/2015 | Nobori | G06T 19/006 345/629 |
| 2017/0076496 | A1* | 3/2017 | Inomata | G06F 3/012 |
| 2017/0228923 | A1* | 8/2017 | Kashihara | G06F 3/012 |
| 2017/0364146 | A1* | 12/2017 | Inomata | G06T 5/002 |

FOREIGN PATENT DOCUMENTS

| | | | |
|---|---|---|---|
| JP | 2008304268 A | 12/2008 | |
| JP | 2009103908 A | * 5/2009 | ............... G09G 5/00 |

* cited by examiner

IMAGE DISPLAY DEVICE AND IMAGE DISPLAY METHOD, IMAGE OUTPUT DEVICE AND IMAGE OUTPUT METHOD, AND IMAGE DISPLAY SYSTEM

CROSS-REFERENCE TO RELATED APPLICATIONS

This application is a national phase entry under 35 U.S.C. § 371 of International Application No. PCT/JP2014/082900 filed Dec. 11, 2014, which claims the benefit of Japanese Priority Patent Application No. JP 2014-007472, filed in the Japanese Patent Office on Jan. 20, 2014.

TECHNICAL FIELD

The technology disclosed in this specification relates to an image display device and an image display method that display an image provided by an image output device, an image output device and an image output method that provide an image to an image display device, and to an image display system made up of an image display device and an image output device. More particularly, the technology disclosed in this specification relates to an image display device, an image display method, an image output device, an image output method, and an image display system that display an image with a wide field of view.

TECHNICAL FIELD

The technology disclosed in this specification relates to an image display device and an image display method that display an image provided by an image output device, an image output device and an image output method that provide an image to an image display device, and to an image display system made up of an image display device and an image output device. More particularly, the technology disclosed in this specification relates to an image display device, an image display method, an image output device, an image output method, and an image display system that display an image with a wide field of view.

BACKGROUND ART

Image display devices that are worn on the head or the face and used to view images, or in other words, head-mounted displays, are known. With a head-mounted display, an image display unit is disposed for each of the left and right eyes, for example, and an enlarged virtual image of a display image is formed by a virtual image optical system, thereby enabling the user to view an immersive image. Head-mounted displays are extremely popular. If mass production advances further in the future, head-mounted displays may become as common as mobile phones, smartphones, or handheld game consoles, and everyone may come to own their own head-mounted display.

When viewing an image on a big screen TV or a head-mounted display, most of one's visual field becomes occupied by that image. Such cases are known to produce motion sickness symptoms, also referred to as virtual reality (VR) sickness. The causes of VR sickness are said to be factors such as a mismatch between the field of view (FOV) of the provided image and the field of view experienced by the viewer, and a mismatch between the depth presented by the image and the depth experienced by the viewer. In particular, VR sickness readily occurs in the case of an image display device used to view images from the first-person view (FPV) or an image display device in which the image is affixed to the viewer's face, like with a head-mounted display.

For example, there has been proposed a VR sickness reduction method including a sickness-coping step that lowers the stimulation strength of a picture of a virtual space presented by a VR system, according to a determination of the user's VR sickness by input of a subjective declaration of VR sickness by the user, or by measurement of physiological indicators.

SUMMARY OF INVENTION

Technical Problem

An objective of the technology disclosed in this specification is to provide an excellent image display device, image display method, image output device, image output method, and image display system able to display or output an image with a wide field of view while also reducing VR sickness.

Solution to Problem

The present application has been filed in view of the above-described problem, a technique recited in claim 1 is an image display device including: a display unit configured to display an image; an attribute information storage unit configured to store attribute information including an attribute of image display on the display unit; and a communication unit configured to communicate with an image output device. The image display device transmits the attribute information to the image output device, receives an image converted by the image output device on a basis of the attribute information, and displays the received image on the display unit.

According to a technique recited in claim 2 of the present application, the image display device according to claim 1 is configured to be used by being worn on a face or head of a viewer who views the image displayed by the display unit.

According to a technique recited in claim 3 of the present application, the display unit of the image display device according to claim 2 includes a display panel configured to display an image and a virtual image optical unit configured to enlarge and project the image displayed on the display panel.

According to a technique recited in claim 4 of the present application, the attribute information storage unit of the image display device according to claim 1 stores information about a first field of view of an image to be displayed by the display unit. The image display device is configured to transmit the information about the first field of view to the image output device, receive an image converted by the image output device on a basis of the first field of view, and display the received image on the display unit.

According to a technique recited in claim 5 of the present application, the image display device of the image display device according to claim 4 is configured to receive an image obtained by converting an original image on a side of the image output device on a basis of a difference between a second field of view of the original image and the first field of view, and display the received image on the display unit.

According to a technique recited in claim 6 of the present application, when the second field of view is greater than the first field of view, the image display device according to claim 5 is configured to receive an image obtained by the image output device cutting out a region of the first field of view from the original image, and display the received image on the display unit.

According to a technique recited in claim 7 of the present application, when the first field of view is equal to or greater than the second field of view, the image display device according to claim 5 is configured to receive the original image from the image output device, and displays the original image on the display unit.

According to a technique recited in claim 8 of the present application, the image display device according to claim 5 is configured to display an image received from the image output device on the display unit, on a basis of a relationship between the first field of view and the second field of view.

According to a technique recited in claim 9 of the present application, the second field of view is greater than the first field of view, and the image display device according to claim 8 is configured to display an image in which a region of the first field of view has been cut out from the original image on the display unit in fullscreen.

According to a technique recited in claim 10 of the present application, when displaying an image having the second field of view less than the first field of view on the display unit, the image display device according to claim 8 is configured to fill in a marginal region with black or display a wallpaper.

According to a technique recited in claim 11 of the present application, the image display device according to claim 8 is configured to stretch an image having the second field of view less than the first field of view out to the first field of view, and display the stretched image on the display unit.

According to a technique recited in claim 12 of the present application, when receiving an image having the second field of view less than the first field of view from the image output device, the image display device according to claim 8 is configured to display the image on the display unit according to a method based on an instruction from a viewer, attribution information about the viewer, or an instruction attached to the original image.

A technique recited in claim 13 of the present application is an image display method including: a step of transmitting attribute information including an attribute of image display to an image output device; a step of receiving an image converted on a basis of the attribute information from the image output device; and a step of displaying the received image.

A technique recited in claim 14 of the present application is an image output device including: a communication unit configured to communicate with an image display device; an image acquisition unit configured to acquire an original image to provide to the image display device; and an image processing unit configured to process the original image. The image output device receives attribute information including an attribute of image display from the image display device, the image processing unit converts the original image on a basis of the attribute information, and the image output device transmits the converted image to the image display device.

According to a technique recited in claim 15 of the present application, the image output device according to claim 14 is configured to receive information about a first field of view of an image to be displayed by the image display device, the image processing unit is configured to convert the original image on a basis of a difference between a second field of view of the original image and the first field of view, and the image output device is configured to transmit the converted image to the image display device.

According to a technique recited in claim 16 of the present application, when the second field of view is greater than the first field of view, the image processing unit of the image output device according to claim 15 is configured to cut out a region of the first field of view from the original image.

According to a technique recited in claim 17 of the present application, when the first field of view is equal to or greater than the second field of view, the image processing unit of the image output device according to claim 15 is not configured to perform conversion of the original image based on a difference of field of view.

According to a technique recited in claim 18 of the present application, the image display device stores the attribute information according to Extended Display Identification Data (EDID) or another predetermined data format. The image output device according to claim 14 is configured to acquire the attribute information from the image display device via the communication unit according to a Display Data Channel (DDC) or another predetermined protocol.

A technique recited in claim 19 of the present application is an image output method including: a step of acquiring an original image to provide to an image display device; a step of receiving attribute information including an attribute of image display from the image display device; a step of converting the original image on a basis of the attribute information; and a step of transmitting the converted image to the image display device.

A technique recited in claim 20 of the present application is an image display system including: an image display device configured to hold attribute information including an attribute of image display; and an image output device configured to output, to the image display device, an image converted on a basis of the attribute information acquired from the image display device.

Note that the term "system" used herein refers to a logical assembly of multiple devices (or function modules that realize specific functions), and does not particularly specify whether or not the devices or function modules are contained within a single housing.

Advantageous Effects of Invention

According to the technology disclosed in this specification, by correcting the mismatch between the field of view of the provided image and the field of view experienced by the viewer, it is possible to provide an excellent image display device, image display method, image output device, image output method, and image display system able to display an image with a wide field of view while also reducing VR sickness.

In addition, according to the technology disclosed in this specification, by correcting the mismatch between the field of view of the image provided on the side of the image output device and the field of view of the image displayed by the image display device, it is possible to provide an excellent image display device, image display method, image output device, image output method, and image display system able to display an image with a wide field of view while also reducing VR sickness.

Note that the advantageous effects described in this specification are merely for the sake of example, and the advantageous effects of the present invention are not limited thereto. Furthermore, in some cases the present invention may also exhibit additional advantageous effects other than the advantageous effects given above.

Further objectives, features, and advantages of the technology disclosed in this specification will be clarified by a

DESCRIPTION OF EMBODIMENT(S)

Hereinafter, an embodiment of the technology disclosed in this specification will be described in detail and with reference to the drawings.

Figure 1:
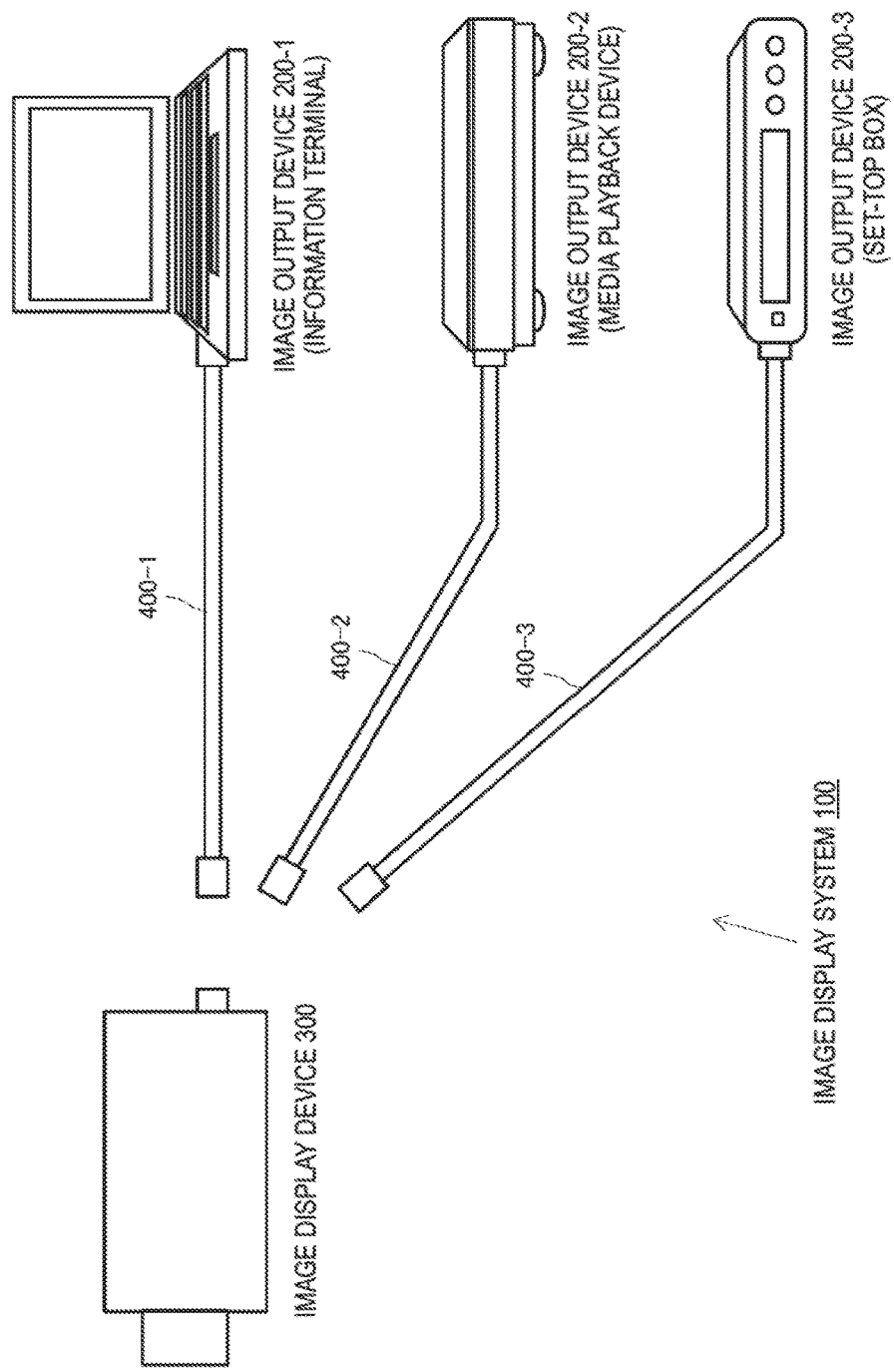
FIG. 1 is a diagram schematically illustrating an example configuration of an image display system 100 applying technology disclosed in this specification.

FIG. 1 schematically illustrates an example configuration of an image display system 100 applying technology disclosed in this specification. The image display system 100 illustrated in the drawing is made up of image output devices 200 that provide images to an image display device 300, and the image display device 300 that displays images provided by the image output devices 200. The image display system 100 is taken to provide images with a wide field of view to the viewer of the image display device 300.

The image output devices 200 that act as suppliers of images are taken to be devices such as an information terminal 200-1, such as a personal computer, a smartphone, or a tablet, a media playback device 200-2 that plays back images from media such as Blu-ray (registered trademark), and a set-top box or TV tuner 200-3.

In addition, the image display device 300 that is supplied with images is taken to be a display device that displays first-person view images which are affixed to the viewer's face or head, like a head-mounted display or a head-up display. Obviously, the image display device 300 may also encompass typical display devices such as big screen displays.

The image output devices 200 and the image display device 300 are interconnected via cables 400-1, 400-2, and 400-3 conforming to interface standards such as Digital Visual Interface (DVI), High Definition Multimedia Interface (HDMI (registered trademark)), and DisplayPort, for example. Obviously, the image output devices 200 and the image display device 300 may be interconnected not by a wired cable 400, but by wireless communication such as Wireless Fidelity (Wi-Fi (registered trademark)), Bluetooth (registered trademark) communication, or Bluetooth (registered trademark) Low Energy (BLE) communication. Alternatively, the image output devices 200 and the image display device 300 may be interconnected by jointly using wired and wireless connections.

The present embodiment supposes that uncompressed image data is transmitted from the image output devices 200 to the image display device 300. Obviously, however, the technology disclosed in this specification may be applied similarly even in the case of transmitting image data in a compressed format conforming to an algorithm such as H264, VC1, Moving Picture Experts Group 2 (MPEG-2), or Joint Photographic Experts Group (JPEG) from the image output devices 200 to the image display device 300.

Figure 2:
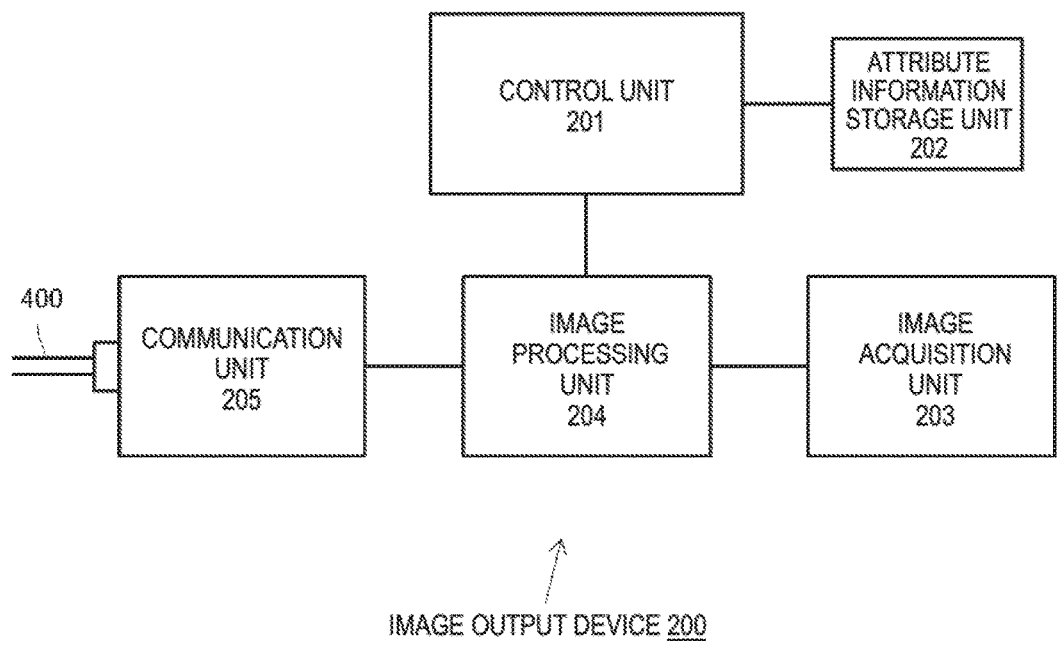
FIG. 2 is a diagram schematically illustrating an internal configuration of a device that functions as an image output device 200 in an image display system 100.

FIG. 2 schematically illustrates an internal configuration of a device that functions as an image output device 200 in the image display system 100. As discussed above, the image output device 200 is a supplier of images to the image display device 300, and in the present embodiment, is taken to be a device such as an information terminal 200-1, such as a personal computer, a smartphone, or a tablet, an image playback device 200-2 that plays back images from media such as Blu-ray (registered trademark), or a set-top box or TV tuner 200-3.

The image output device 200 illustrated in FIG. 2 is equipped with a control unit 201, an attribute information storage unit 202, an image acquisition unit 203, an image processing unit 204, and a communication unit 205.

The control unit 201 is made up of components such as a central processing unit (CPU), random access memory (RAM), and read-only memory (ROM), for example, and centrally controls operation inside the image output device 200.

The attribute information storage unit 202 is made up of non-volatile memory such as electrically erasable programmable ROM (EEPROM), for example, and stores attribute information. The attribute information includes information such as the resolution and frame rate of images handled by the image output device 200, manufacturer identification information (VendorID), and product identification information (ProductID). For the file format used to store such attribute information, Extended Display Identification Data (EDID) may be used, but the file format is not particularly limited thereto.

The present embodiment supposes that EDID is enhanced, and attribute information related to images and audio handled by the image output device 200 as given below is stored in the attribute information storage unit 202.

It should be appreciated that the attribution information related to image display also includes the field of view (FOV$_O$) of the original image that the image output device 200 delivers to the image display device 300.

(1) Attribute information related to image display
  Resolution
  Image shape, aspect ratio
  Frame rate (frequency)
  Field of view (including binocular, per-eye, and amount of overlap)
  Distortion information
  Interpupillary distance and visual acuity
  Gamut, brightness, gamma
  Whether or not to stretch the image when the FOV of the original image differs from the FOV viewed with the image display device 300
  Information regarding text display
  Display position, surface area, font, size, color, . . .
  Latency from signal input until input is displayed (not just limited to picture)
(2) Attribute information related to audio output
  Headphones or speakers
  Number of headphones or speakers The image acquisition unit 203 acquires image data to provide to the image display device 300. If the image output device 200 is an information terminal such as a personal computer, a smartphone, or a tablet, the image acquisition unit 203 receives image content from a device such as a content server on the Internet by streaming or the like, for example. Also, if the image output device 200 is a Blu-ray (registered trademark) or other media playback device, the image acquisition unit 203 reads out image data from a medium. Also, if the image output device 200 is a set-top box or a TV tuner, the image acquisition unit 203 tunes into and receives broadcast content. The field of view of an original image acquired by the image acquisition unit 203 to provide to the image display device 300 is hereinafter designated FOV$_O$.

The image processing unit 204 performs a process of converting image data acquired by the image acquisition unit 203 into image data in a format suitable for display on the image display device 300. The conversion process referred to herein involves adjusting the field of view, and will be discussed in detail later.

The communication unit 205 transmits image data processed by the image processing unit 204 to the image display device 300 over the cable 400. The configuration of the communication unit 205 is arbitrary. For example, the communication unit 205 may be configured according to a communication protocol applied to communication with the image display device 300 that acts as a communication peer. The present embodiment supposes that the communication unit 205 is configured in accordance with an interface standard such as DVI, HDMI (registered trademark), or DisplayPort.

Figure 3:
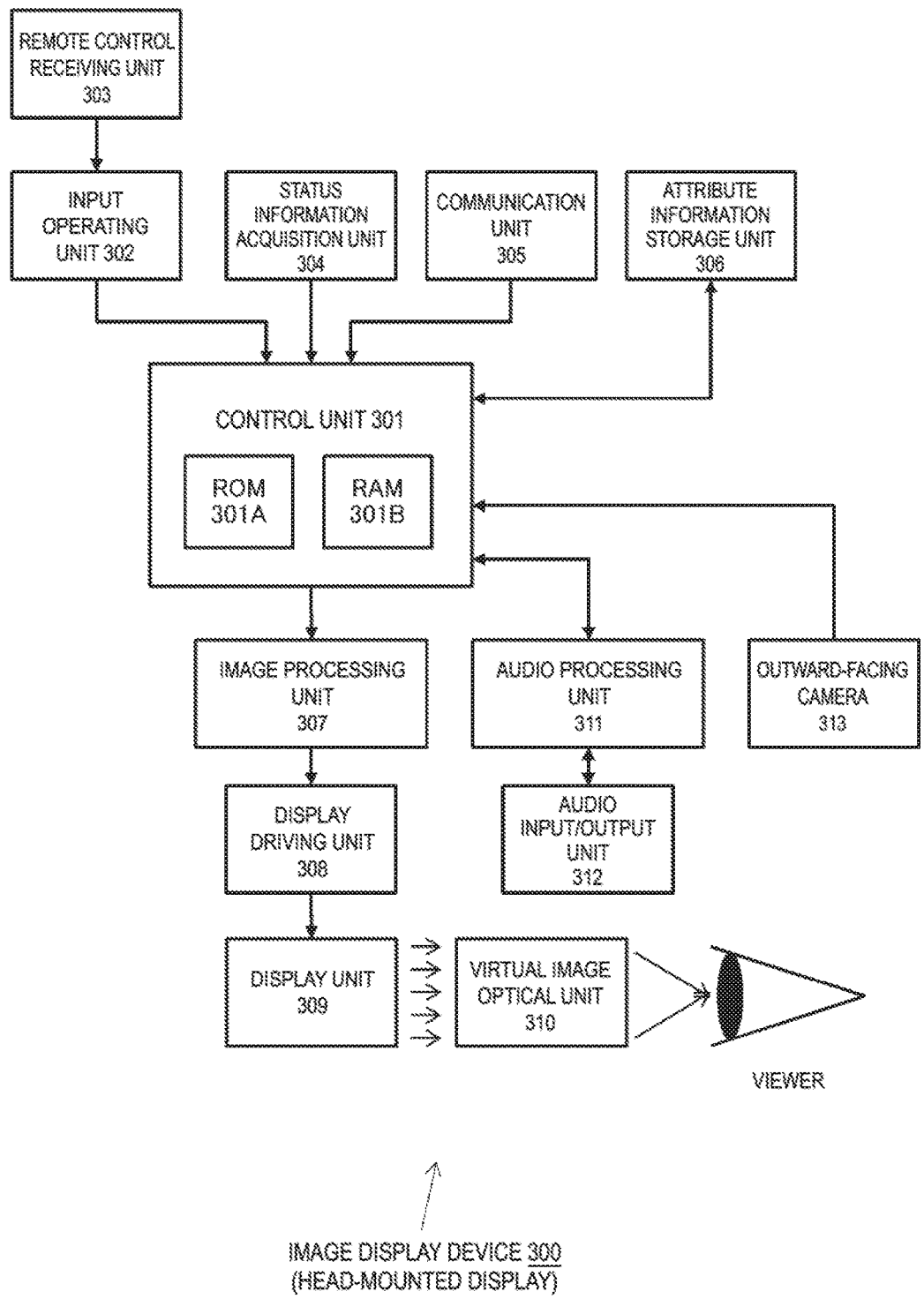
FIG. 3 is a diagram schematically illustrating an internal configuration of a device that functions as an image display device 300 in an image display system 100.

FIG. 3 schematically illustrates an internal configuration of a device that functions as an image display device 300 in the image display system 100. As discussed above, the image display device 300 displays an image provided by the image output device 200, and is taken to be a display device that displays first-person view images which are affixed to the viewer's face or head, like a head-mounted display or a head-up display.

The control unit 301 is equipped with read-only memory (ROM) 301A and random access memory (RAM) 301B. The ROM 301A stores program code executed by the control unit 301, and various data. The control unit 301, by executing a program loaded into the RAM 301B, controls the display of images as well as centrally controlling the operation of the image display device 300 overall. The program data stored in the ROM 301A may be programs such as an image display control program for the playback of moving image content, and a communication control program that communicates with external equipment, such as the image output device 200 that acts as the image provider, in accordance with a predetermined communication protocol.

The input operating unit 302 is equipped with one or more operating elements on which the user performs an input operation (none of them shown), such as keys, buttons, and switches, receives user instructions via the operating elements, and outputs to the control unit 301. Also, the input operating unit 302 receives user instructions made up of remote control commands received by the remote control receiving unit 303, and outputs to the control unit 301.

The status information acquisition unit 304 is a function module that acquires status information about the image display device 300 itself or the user wearing the image display device 300 (the viewer of the display image). The status information acquisition unit 304 may be equipped with various sensors for detecting its own status information, or be configured to acquire status information via a communication unit 305 (discussed later) from external equipment equipped with some or all of such sensors (for example, a smartphone, wristwatch, or some other multifunction terminal being worn by the user). In addition, the user may also be able to directly specify or input such attribute information.

The status information acquisition unit 304 acquires information about the position and orientation or information about the orientation of the user's head, for example, in order to track the user's head movements. To track the user's head movements, the status information acquisition unit 304 is taken to be a sensor including a three-axis gyro sensor, a three-axis acceleration sensor, and a three-axis geomagnetic sensor, for a total of nine detectable axes, for example. In addition, the status information acquisition unit 304 may further combine and use the above with one or multiple other sensors such as a Global Positioning System (GPS) sensor, a Doppler sensor, an infrared sensor, or a radio field intensity sensor. In addition, the status information acquisition unit 304 may further combine and use the acquisition of position and orientation information with information provided by various infrastructure, such as mobile phone base station information or PlaceEngine (registered trademark) information (radio field intensity measurement information from a wireless LAN access point). In the example illustrated in FIG. 3, the status information acquisition unit 304 for head movement tracking is built into a head-mounted display acting as the image display device 300, but may also be configured by an accessory part of the like that is externally attached to the head-mounted display. In the latter case, the status information acquisition unit 304 expresses head orientation information in the form of rotation matrices, for example, and transmits the head orientation information to the main head-mounted display by wireless communication such as Bluetooth (registered trademark) communication, or by a high-speed wired interface such as Universal Serial Bus (USB).

In addition, besides tracking the user's head movements as discussed above, the status information acquisition unit 304 may also acquire other information as status information about the user wearing the image display device 300, such as the user's operating status (whether or not the user is wearing the head-mounted display 100), the user's behavioral status (a movement status such as being still, walking, or running, gestures made with the hands or fingers, the open/closed status of the eyelids, the gaze direction, and the size of the pupils), the psychological status (such as whether the user is immersed in viewing the display image), visual acuity (vision), as well as the physiological status. In addition, in order to acquire this status information from the user, the status information acquisition unit 304 may also be equipped with various status sensors such as a wear sensor made up of a mechanical switch or the like, an inward-facing camera that photographs the user's face, a gyro sensor, an acceleration sensor, a velocity sensor, a pressure sensor, a temperature sensor that senses body temperature or air temperature, a sweat sensor, a pulse sensor, a myoelectric potential sensor, an oculo-electric potential sensor, a brain wave sensor, a breath sensor, and a gas ion concentration sensor, as well as a timer (none illustrated in the drawing).

The communication unit 305 conducts a communication process with external equipment, as well as modulation/demodulation and coding/decoding processes on communication signals. The external equipment may be an image output device 200 that supplies images. Also, the control unit 301 transmits transmission data to external equipment from the communication unit 305. The configuration of the communication unit 305 is arbitrary. For example, the communication unit 305 may be configured according to a communication protocol applied to communication with an image output device 200 that acts as a communication peer. The present embodiment supposes that the communication unit 305 is configured in accordance with an interface standard such as DVI, HDMI (registered trademark), or DisplayPort.

The attribute information storage unit 306 is made up of non-volatile memory such as electrically erasable programmable ROM (EEPROM), for example, and stores attribute information. The attribute information includes information such as the resolution and frame rate when the image display device 300 displays images, manufacturer identification information (VendorID), and product identification information (ProductID). For the file format used to store such attribute information, EDID may be used, but the file format is not particularly limited thereto.

The present embodiment supposes that EDID is enhanced, and attribute information related to image display and attribute information related to audio output provided by the image display device 300, attribute information about the user of the image output device 200, and attribute information related to sensors provided by the image output device 200 as given below are stored in the attribute information storage unit 306. The attribution information related to image display is also taken to include the field of view ($FOV_D$) of the image displayed by the image display device 300.

(1) Attribute information related to image display
  Resolution
  Image shape, aspect ratio
  Frame rate (frequency)
  Field of view (including binocular, per-eye, and amount of overlap)
  Distortion information
  Interpupillary distance and visual acuity
  Gamut, brightness, gamma
  Whether or not to stretch the image when the FOV of the original image differs from the FOV viewed with the image display device 300
  Information regarding text display
  Display position, surface area, font, size, color, . . .
  Latency from signal input until input is displayed (not just limited to picture)

(2) Attribute information related to audio output
  Headphones or speakers
  Number of headphones or speakers (3) Attribute information related to user
  Interpupillary distance and visual acuity
  Hearing ability, ear shape
  Height, weight, physique, gait
  User identification information (encrypted authentication password)
  Susceptibility to VR sickness
  Age (such as not outputting stereoscopic views for children)

(4) Attribute information related to sensors
  microphone, inward-facing camera, outward-facing camera, motion sensor, eye tracking
  presence/absence and number of each sensor
  information such as position, direction, sampling rate, and precision
  camera angle of view, frame rate, brightness, pixel count, distortion, color, gamma, . . .
  position information about object other than head (hands, feet, waist, gun controller, remote control, . . . )
  any method, such as markers or image recognition, may be used The image processing unit 307 additional conducts signal processing such as image quality correction on an image signal output from the control unit 301, and also converts the image signal to a resolution suited to the screen of the display unit 309. Subsequently, the display driving unit 308 sequentially selects the pixels of the display unit 309 every row while performing line-sequential scanning, and supplies a pixel signal based on the processed image signal.

The display unit 309 includes a display panel (not illustrated) made up of a microdisplay such as organic electroluminescence (EL) elements or a liquid crystal display, or alternatively, a laser-scanning display such as a retinal scanning display.

The virtual image optical unit 310 enlarges and projects the display image of the display unit 309, enabling the user to view the display image as an enlarged virtual image. The virtual image optical unit 310 enlarges and projects the display image of the display unit 309, enabling the user to view the display image as an enlarged virtual image having a suitable angle of view. The virtual image optical unit 310 is equipped with a wide field of view optical system, and forms an enlarged virtual image having a 45-degree angle of view onto the user's eyes, for example (see Patent Literature 1, for example), thereby recreating the sense of sitting in the best seat of a movie theater. Hereinafter, the field of view of the enlarged virtual image viewed by the user will be designated $FOV_D$.

The audio processing unit 311 performs audio quality correction and audio amplification on an audio signal output from the control unit 301, and additionally performs signal processing on signals such as an input audio signal. Additionally, the audio input/output unit 312 externally outputs the processed audio, and also accepts audio input from a microphone (not illustrated).

The outward-facing camera 313 is disposed near the center of the front face of the main unit of the head-mounted display 100, for example (not illustrated), and is able to capture an image of the surroundings. More preferably, the outward-facing camera 313 is made up of multiple cameras to enable the outward-facing camera 313 to acquire three-dimensional information about the image of the surroundings by using parallax information. Also, even if a single camera is used, simultaneous localization and mapping (SLAM) image recognition may also be used to capture images while moving the camera, compute parallax information using multiple frame images succeeding each other in time (see Patent Literature 2, for example), and acquire three-dimensional information about the image of the surroundings from the computed parallax information.

The following illustrates examples of methods by which the status information acquisition unit 304 acquires information about visual acuity.

(1) The user inputs information manually.
(2) The user inputs information related to vision-correcting lenses prepared in advance (such as a model number), and a separately prepared database is cross-referenced.
(3) Instead of having the user manually input information such as a model number of vision-correcting lenses, the status information acquisition unit 304 scans information written on the lenses. The information may be written and scanned by mechanical (such as shapes and numbers of notches), electrical, or optical (such as barcode patterns) methods.
(4) Calibration is performed while wearing lenses, and vision is measured or a distortion correction table is created. An established calibration pattern such as a square grid is displayed on the display panel and photographed with a camera at the user's eye positions to acquire a distortion pattern, and a suitable distortion correction table is created by calculating an inverse mapping.

Additionally, a lens attachment for correcting the user's vision may be used. In this case, the status information acquisition unit 304 may automatically identify the presence of type of the lens attachment by mechanical, electrical, optical, or some other means, acquire information related to the user's vision, and thereby select a suitable distortion correction table according to the user's vision. Similar effects may be obtained by having the user configure such vision information him- or herself.

In the case of displaying an image with a wide field of view with the image display device 300, there are concerns about inducing VR sickness in the user who views the image. In particular, VR sickness is readily induced when the image display device 300 has a screen affixed to the user's face and is configured for the viewing of first-person view images, like with a head-mounted display.

The causes of VR sickness are various. In the case of an image display system 100 made up of image output devices 200 and an image display device 300 as illustrated in FIG. 1, a mismatch between the field of view of an image provided by an image output device 200 and the field of view viewed by the user of the image display device 300 is thought to be a major cause of inducing VR sickness. When an image with a wide range provided by an image output device 200 is viewed over a narrow field on the side of the image display device 300 or when an image with a narrow range provided by an image output device 200 is viewed over a wide field on the side of the image display device 300, distortion remains and readily induces VR sickness.

Accordingly, the image display system 100 according to the present embodiment is configured to prevent VR sickness by exchanging attribute information including information related to image display between the image output device 200 and the image display device 300, and having the image output device 200 output an image that has been converted to a format suited to image display on the side of the image display device 300. The image conversion process is conducted by the image processing unit 204 inside the image output device 200.

Image format conversion includes a process of matching the field of view $FOV_O$ of an image provided by the image output device 200 with the field of view $FOV_D$ viewed by the user of the image display device 300, for example.

Figure 4:
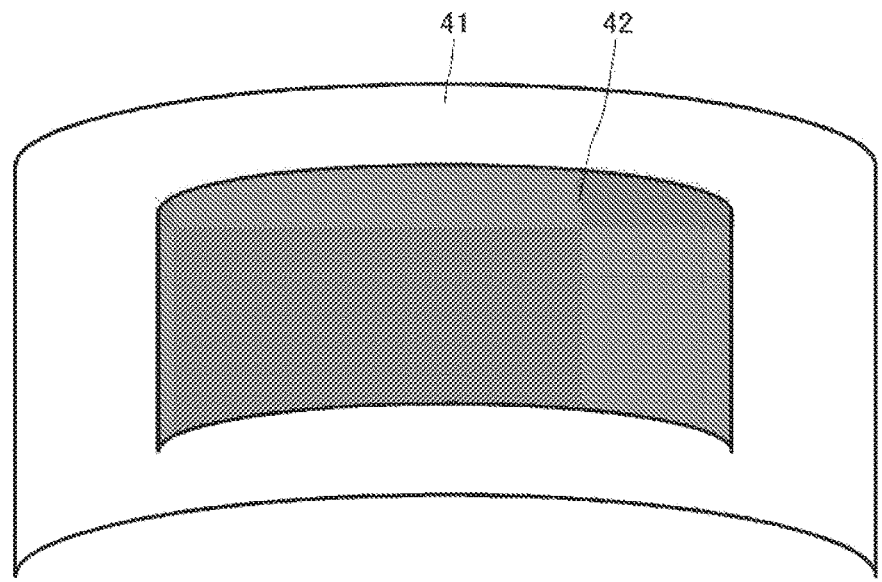
FIG. 4 is a diagram for explaining a process of matching a field of view $FOV_O$ of an image provided by an image output device 200 with a field of view $FOV_D$ viewed by a user of an image display device 300.

As illustrated in FIG. 4, when the field of view $FOV_O$ of an original image 41 provided by the image output device 200 is greater than the field of view $FOV_D$ of the image viewed by the user wearing the image display device 300 ($FOV_O > FOV_D$), the image output device 200 cuts out a region 42 with the field of view $FOV_D$ from the original image 41 for delivery to the image display device 300.

Figure 5:
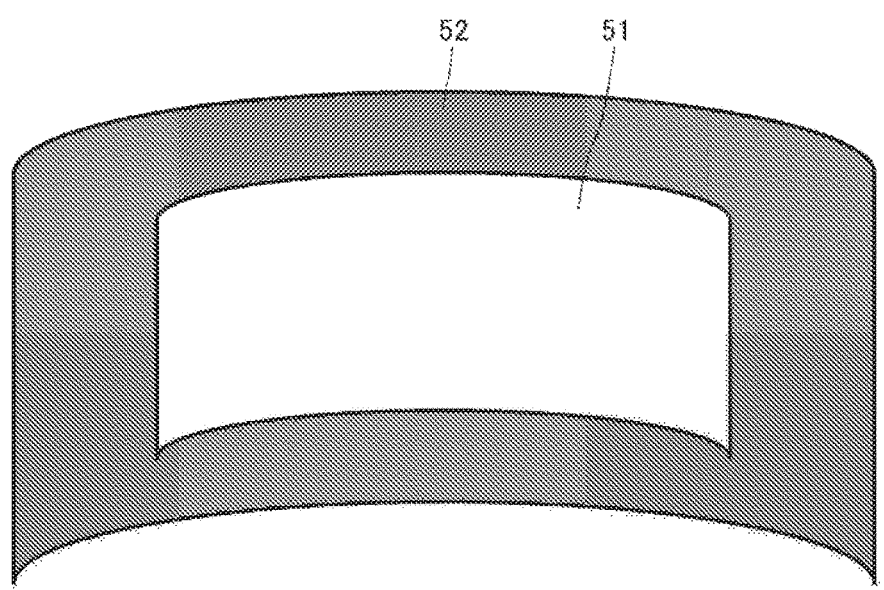
FIG. 5 is a diagram for explaining a process of matching a field of view $FOV_O$ of an image provided by an image output device 200 with a field of view $FOV_D$ viewed by a user of an image display device 300.

Also, as illustrated in FIG. 5, when the field of view $FOV_D$ of an original image 51 provided by the image display device 300 is equal to or greater than the field of view $FOV_O$ of the image 52 viewed by the user wearing the image output device 200 ($FOV_D \geq FOV_O$), the image output device 200 delivers the original image 51 as-is to the image display device 300.

Additionally, on the side of the image display device 300, screen display is performed according to the format of the image sent from the image output device 200.

Figure 6:
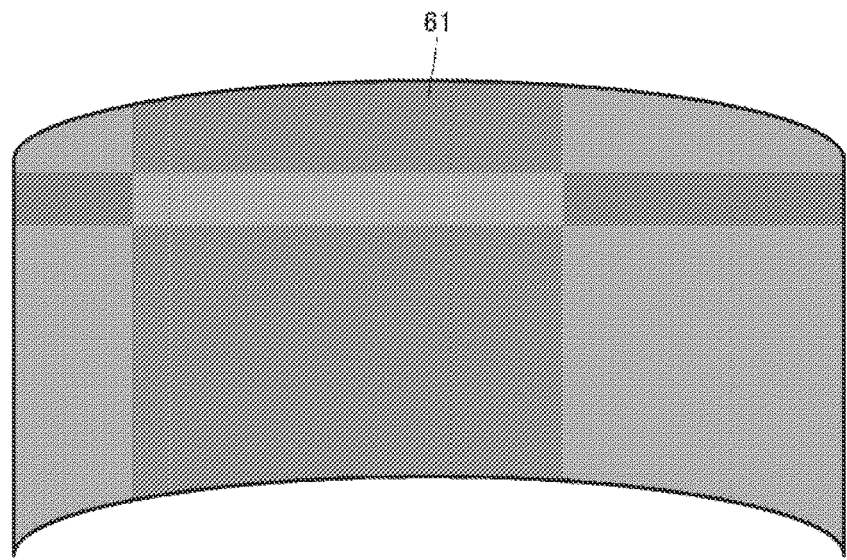
FIG. 6 is a diagram for explaining a process of displaying an image transmitted from an image output device 200 on a side of an image display device 300.

When the field of view $FOV_O$ of the original image provided by the image output device 200 is greater than the field of view $FOV_D$ of the image viewed by the user wearing the image display device 300 ($FOV_O > FOV_D$), and the image output device 200 delivers a region with the field of view $FOV_D$ cut out from the original image (see FIG. 4), the field of view $FOV_T$ of the transmitted image becomes equal to the field of view $FOV_D$ of the image viewed by the user of the image display device 300. Accordingly, on the side of the image display device 300, as illustrated in FIG. 6, the image 61 sent from the image output device 200 is displayed as-is on the display unit 309 in fullscreen.

In addition, when the field of view $FOV_D$ of the original image provided by the image display device 300 is equal to or greater than the field of view $FOV_O$ of the image viewed by the user wearing the image output device 200 ($FOV_D \geq FOV_O$), an image from a field of view $FOV_T$ less than the field of view $FOV_D$ of the image viewed by the user of the image display device 300 is transmitted from the image output device 200.

Figure 7:
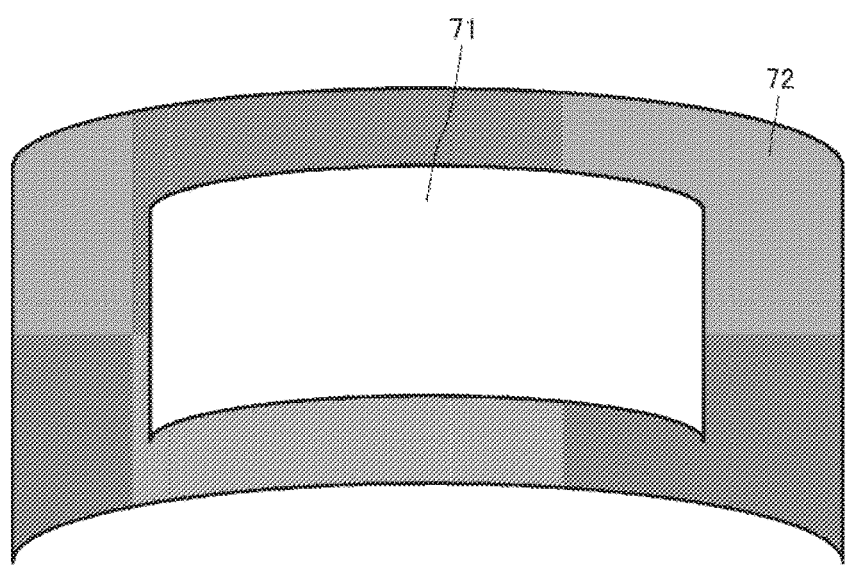
FIG. 7 is a diagram for explaining a process of displaying an image transmitted from an image output device 200 on a side of an image display device 300.

In such a case, on the side of the image display device 300, the marginal region 72 when displaying the transmitted image 71 with the field of view $FOV_T$ in the range of the field of view $FOV_D$ may be filled in with black as illustrated in FIG. 7, or alternatively, a wallpaper may be displayed. Alternatively, on the side of the image display device 300, the transmitted image 81 with the field of view $FOV_T$ is stretched out to the field of view $FOV_D$ indicated by the reference sign 82 and displayed on the display unit 309, as illustrated in FIG. 8.

Figure 8:
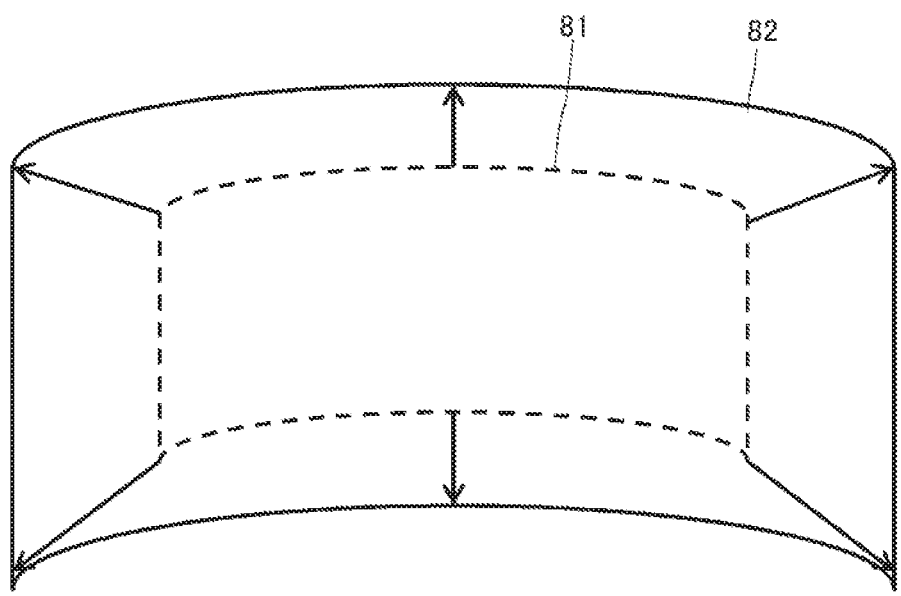
FIG. 8 is a diagram for explaining a process of displaying an image transmitted from an image output device 200 on a side of an image display device 300.

The processing method when displaying the transmitted image with the field of view $FOV_T$ in the range of the field of view $FOV_D$ (filling in the marginal region with black or displaying a wallpaper, as illustrated in FIG. 7, or stretching the transmitted image with the field of view $FOV_T$ out to the field of view $FOV_D$ for display, as illustrated in FIG. 8) may be user-specifiable from the input operating unit 302 or the like, or automatically selected on the basis of information such as user attribute information in the image display device 300. Alternatively, a processing method may be prescribed in information such as the metadata of the original image in some cases.

To execute processes as illustrated in FIGS. 4 and 5 on the image output device 200 and to execute processes as illustrated in FIGS. 6 to 8 on the image display device 300, it is necessary for the image output device 200 and the image display device 300 to exchange the attribute information stored in each other's attribute information storage units 202 and 306. For example, the Display Data Channel (DDC) is known as a protocol for transmitting EDID, but this protocol may also be used to exchange attribute information. Obviously, the exchange of attribute information is not limited to DDC, and some other protocol may be used to exchange attribute information via the cable 400.

Figure 9:
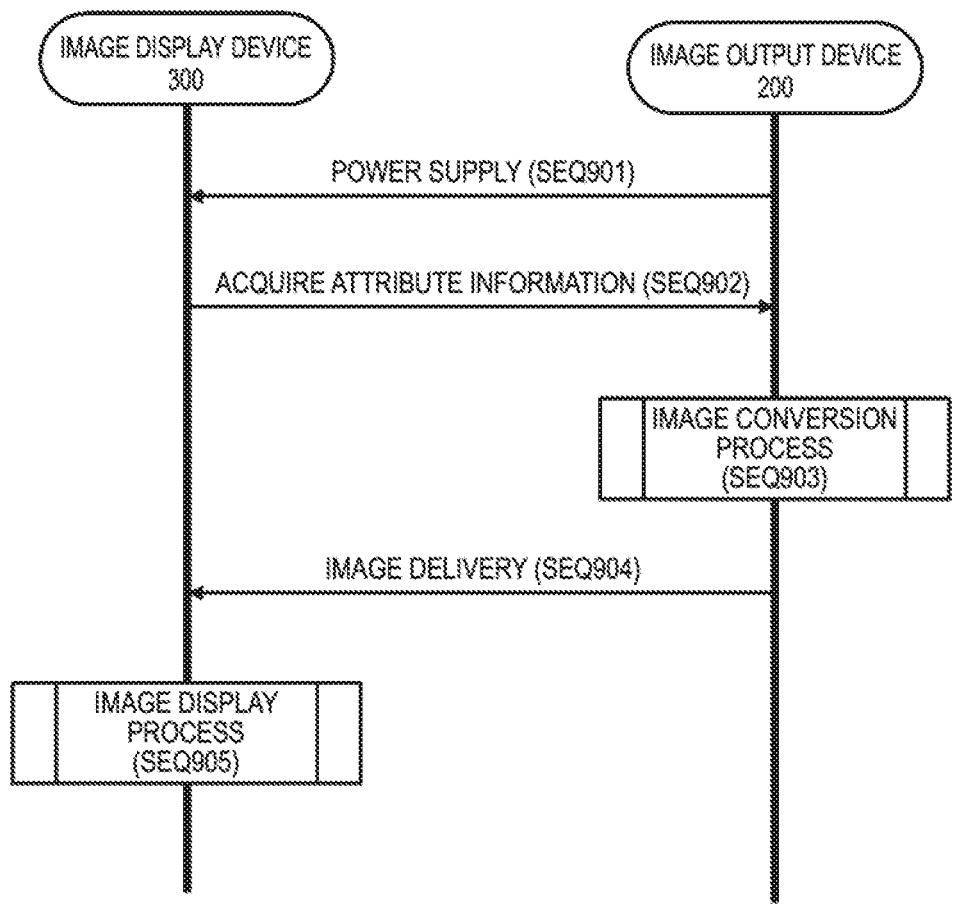
FIG. 9 is a diagram illustrating an example of an operation sequence of an image display system 100 that delivers an image from an image output device 200 for display on an image display device 300.

FIG. 9 illustrates an example of an operation sequence of the image display system 100 that delivers an image from the image output device 200 for display on the image display device 300.

When a DVI, HDMI (registered trademark), or Display-Port cable 400 is used to connect the image display device 300 to the image output device 200, power is supplied to the image display device 300 via the cable 400 (SEQ901), and the image display device 300 starts up.

From the image display device 300, the image output device 200 acquires attribute information related to image display, such as the field of view $FOV_D$ viewed by the user, and the screen shape and resolution of the display unit 309 (SEQ902).

The attribute information related to image display is stored in the attribute information storage unit 306 inside the image display device 300. The attribute information is stated in EDID format, for example, and the image output device 200 is able to acquire required attribute information according to the DDC protocol, for example. Obviously, the file format stating attribute information is not limited, and in addition, the image output device 200 may also be configured to acquire attribute information using another protocol.

The image output device 200, on the basis of the attribute information acquired from the image display device 300, performs a format conversion process on the image to provide to the image display device 300 with the image processing unit 204 (SEQ903). Subsequently, the image output device 200 delivers the format-converted image to the image display device 300 (SEQ904).

Subsequently, the image display device 300 performs processing according to the format on the image received from the image output device 200, and displays the image on the display unit 309 (SEQ905).

Figure 10:
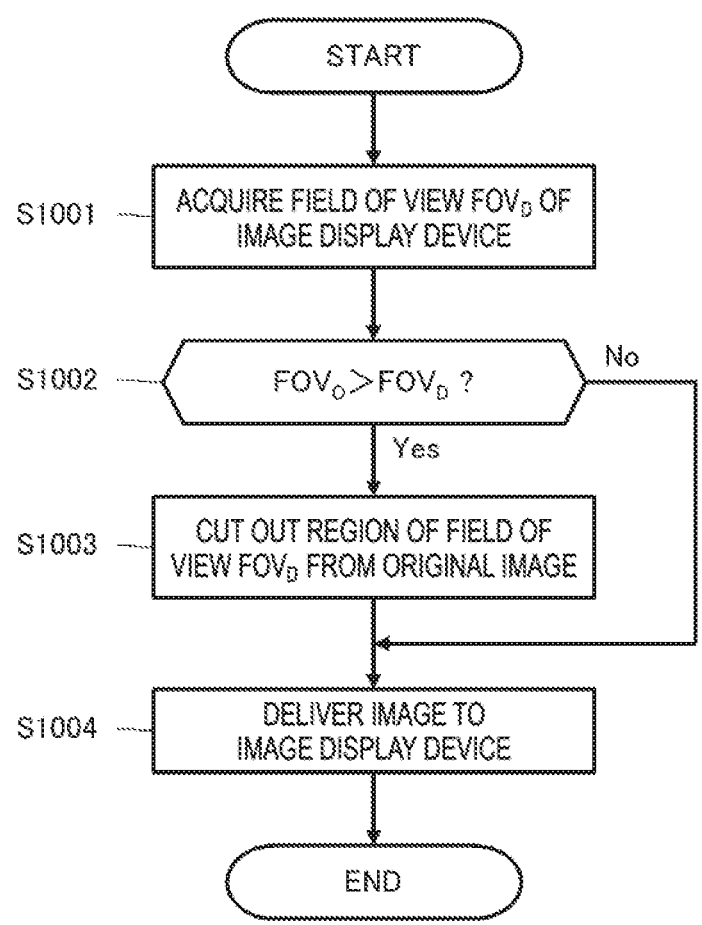
FIG. 10 is a flowchart illustrating a sequence of an image format conversion process executed in an image output device 200 in SEQ903 of FIG. 9.

FIG. 10 illustrates, in flowchart format, a sequence of the image format conversion process executed in the image output device 200 in SEQ903 of FIG. 9. Image format conversion is a process of matching the field of view $FOV_O$ of an image provided by the image output device 200 with the field of view $FOV_D$ viewed by the user of the image display device 300, for example, and is taken to be executed by the image processing unit 204.

First, the field of view $FOV_D$ viewed by the user of the image display device 300 is acquired from the image display device 300 via the communication unit 205 (step S1001). Subsequently, the image processing unit 204 compares the field of view $FOV_O$ of an image provided by the image output device 200 to the field of view $FOV_D$ viewed by the user of the image display device 300 (step S1002).

When the field of view $FOV_O$ of the original image provided by the image output device 200 is greater than the field of view $FOV_D$ of the image viewed by the user wearing the image display device 300 (step S1002, Yes), the image processing unit 204 cuts out a region with the field of view $FOV_D$ from the original image (step S1003).

On the other hand, when the field of view $FOV_D$ of the original image provided by the image display device 300 is equal to or greater than the field of view $FOV_O$ of the image viewed by the user wearing the image output device 200 (step S1002, No), the image processing unit 204 does not process the original image.

Subsequently, after performing a process like the above, the image is delivered from the communication unit 205 to the image display device 300 via the cable 400 (step S1004).

Figure 12:
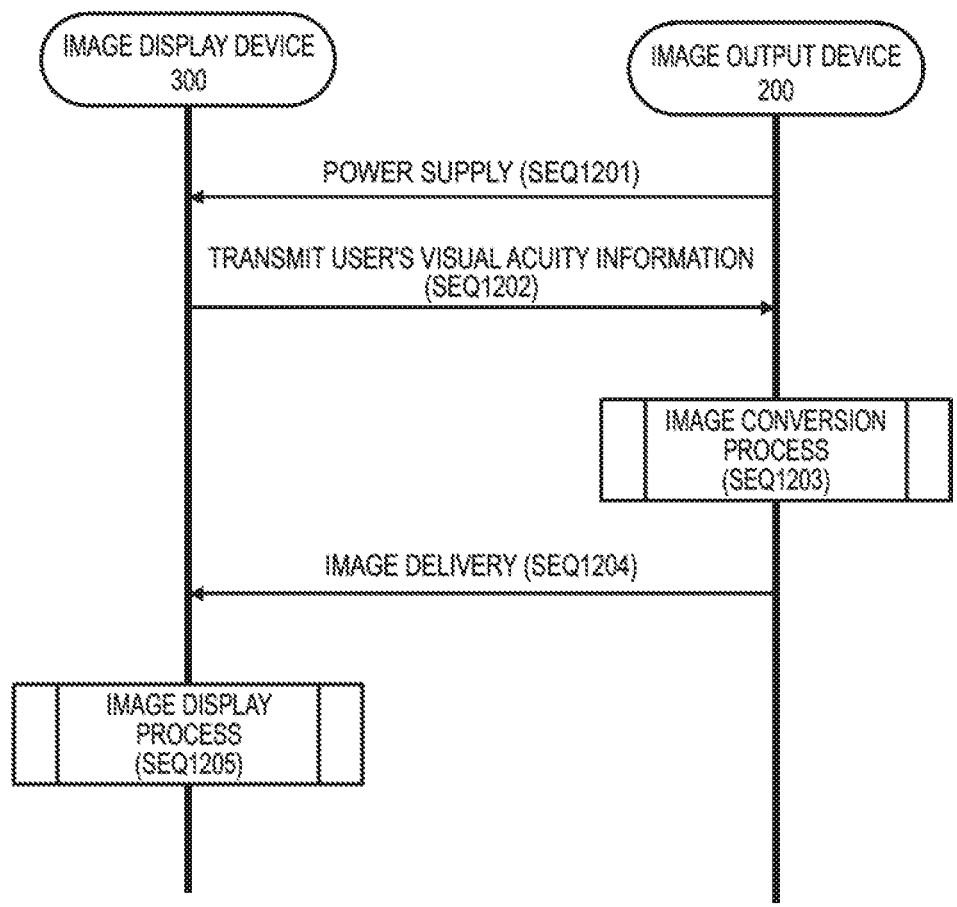
FIG. 12 is a diagram illustrating another example of an operation sequence of an image display system 100 that delivers an image from an image output device 200 for display on an image display device 300.

Meanwhile, FIG. 12 illustrates another example of an operation sequence of the image display system 100 that delivers an image from the image output device 200 for display on the image display device 300.

When a DVI, HDMI (registered trademark), or Display-Port cable 400 is used to connect the image display device 300 to the image output device 200, power is supplied to the image display device 300 via the cable 400 (SEQ1201), and the image display device 300 starts up.

The image display device 300 transmits information about the user's visual acuity (vision) acquired by the status information acquisition unit 304 to the image output device 200 (SEQ1202). The method of acquiring information about visual acuity is as already described.

The image output device 200 switches a distortion correction table according to the visual acuity information acquired from the image display device 300, and on the basis of the distortion correction table, performs a conversion process on the image to provide to the image display device 300 with the image processing unit 204 (SEQ1203).

Subsequently, the image output device 200 delivers the converted image to the image display device 300 (SEQ1204), and the image display device 300 displays the image received from the image output device 200 on the display unit 309 (SEQ1205).

Figure 13:
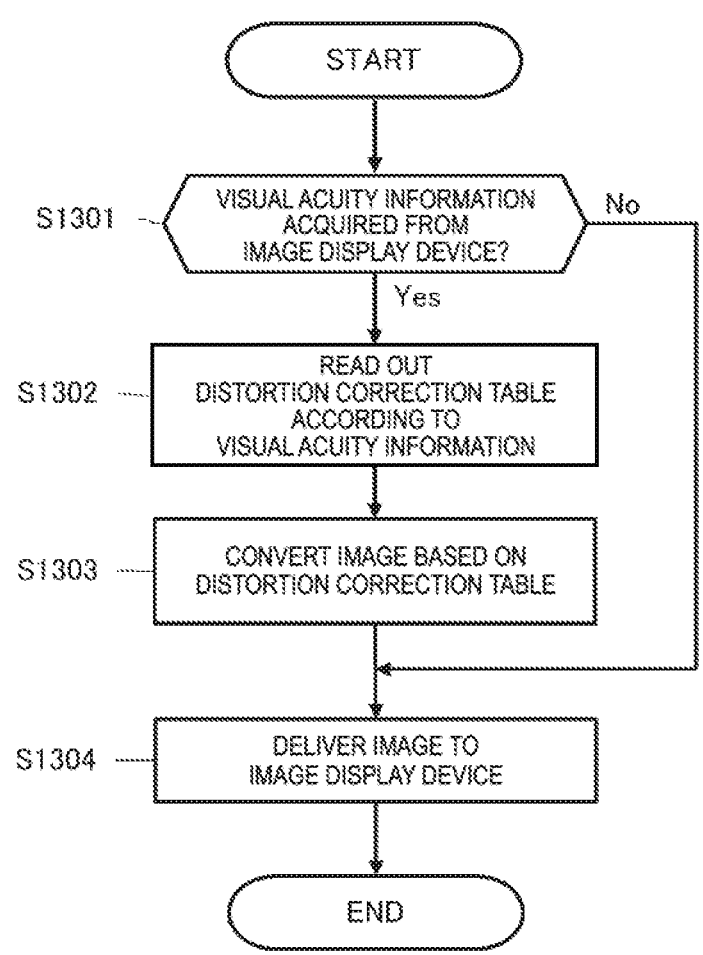
FIG. 13 is a flowchart illustrating a sequence of a distortion correction table switching and image conversion process executed in an image output device 200 in SEQ1203 of FIG. 12.

FIG. 13 illustrates, in flowchart format, a sequence of the distortion correction table switching and image conversion process executed in the image output device 200 in SEQ1203 of FIG. 12.

When the user's visual acuity information is successfully acquired from the image display device 300 (step S1301, Yes), a distortion correction table is read out according to the visual acuity information (step S1302). Subsequently, the read-out distortion correction table is used to perform an image conversion process (step S1303), and the converted image is delivered to the image display device 300 (step S1304).

On the other hand, when the user's visual acuity information is not successfully acquired from the image display device 300 (step S1301, No), the image output device 200 delivers the image to the image display device 300 without performing a conversion process according to the user's visual acuity (step S1304).

The head-mounted display applied as the image display device 300 is ordinarily equipped with eye lenses (such as the virtual image optical unit 310 in FIG. 3). In addition, it is anticipated that some users who wear the head-mounted display will use additional lenses, such as vision-correcting glasses. Consequently, the distortion correction table includes information for cancelling out the distortion of the combined optical system as a whole, which is made up of the distortion caused by the eye lenses of the head-mounted display and the distortion caused by additional lenses.

When the user wearing the head-mounted display is not using vision-correcting glasses, it is sufficient to read out a distortion correction table that corrects only the distortion caused by the eye lenses of the head-mounted display, and perform the image conversion process. In addition, a distortion correction table for the distortion caused by the eye lenses of the head-mounted display and a distortion correction table for the distortion caused by vision-correcting glasses may be stored separately, and during the image conversion process, a suitable combination of distortion correction tables may be read out, and a distortion correction table combining the two may be used to perform the image conversion process.

Figure 11:
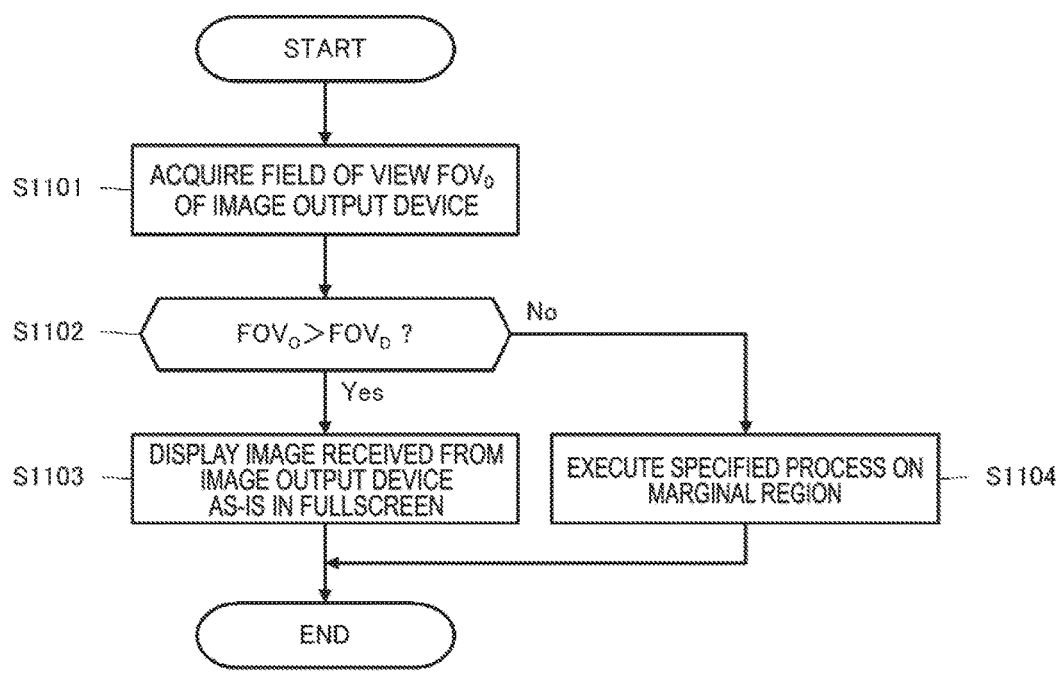
FIG. 11 is a flowchart illustrating a sequence of an image display process executed in an image display device 300 in SEQ905 of FIG. 9.

FIG. 11 illustrates, in flowchart format, a sequence of an image display process executed in the image display device 300 in SEQ905 of FIG. 9 (or SEQ1205 of FIG. 12). The process illustrated in the drawing is taken to be executed by the control unit 301 or the image processing unit 307.

First, the field of view $FOV_O$ of the image provided by the image output device 200 is acquired from the image output device 200 via the communication unit 305 (step S1101). However, information indicating not only the field of view $FOV_O$, but also what kind of format conversion process to apply to the image to be output, may also be acquired.

Subsequently, the field of view $FOV_O$ of the original image provided by the image output device 200 and the field of view $FOV_D$ of the image viewed by the user wearing the image display device 300 are compared (step S1102).

When the field of view $FOV_O$ of the original image provided by the image output device 200 is greater than the field of view $FOV_D$ of the image viewed by the user wearing the image display device 300 (step S1102, Yes), it is known that the image output device 200 will deliver a region with the field of view $FOV_D$ cut out from the original image, or in other words, the field of view $FOV_T$ of the transmitted image will be equal to the field of view $FOV_D$ of the image viewed by the user of the image display device 300. Accordingly, as illustrated in FIG. 6, the control unit 301 instructs the image processing unit 307 to display the image transmitted from the image output device 200 as-is on the display unit 309 in fullscreen (step S1103).

On the other hand, when the field of view $FOV_D$ of the original image provided by the image display device 300 is equal to or greater than the field of view $FOV_O$ of the image viewed by the user wearing the image output device 200 (step S1102, No), the field of view $FOV_T$ of the image transmitted from the image output device 200 is known to be less than the field of view $FOV_D$ of the image viewed by the user of the image display device 300. Accordingly, the control unit 301 instructs the image processing unit 307 to execute a process specified by the user, a process automatically selected by the image display device 300, or a process specified by the original image. Subsequently, the image processed by the image processing unit 307 is displayed on the display unit 309 (step S1104).

In step S1104, as illustrated in FIG. 7, the image processing unit 307 fills in with black or displays a wallpaper in the marginal region when displaying the transmitted image with the field of view $FOV_T$ in the range of the field of view $FOV_D$. Alternatively, as illustrated in FIG. 8, the image processing unit 307 stretches the transmitted image with the field of view $FOV_T$ out to the field of view $FOV_D$ for display on the display unit 309.

In this way, according to the image display system 100 in accordance with the present embodiment, by correcting the mismatch between the field of view $FOV_O$ of the image provided by the side of the image output device 200 and the field of view $FOV_D$ of the image displayed by the image display device 300, it is possible to display images from the first-person view or images with a wide field of view while reducing VR sickness.

In addition, the user is not required to perform operations for looking up and setting the field of view $FOV_D$ of the image display device 300 the user is wearing in the image output device 200, and is always able to view the images transmitted from the image output device 200 with a suitable field of view. As a result, it is possible to greatly reduced VR sickness in the user.

In addition, according to the image display system 100 in accordance with the present embodiment, by having the side of the image output device 200 provide the image display device 300 with an image that has been corrected to cancel out both the distortion caused by the eye lenses mounted on board the image display device 300 and the distortion caused by vision-correcting glasses, it is possible to display images from the first-person view or images with a wide field of view while reducing VR sickness.

CITATION LIST

Patent Literature

Patent Literature 1: JP 2000-339490A
Patent Literature 2: JP 2008-304268A

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

This specification primarily describes an embodiment for the case in which the image display device 300 is configured as a head-mounted display, but the gist of the technology disclosed in this specification is not limited thereto. The technology disclosed in this specification may be applied similarly even if the image display device 300 is various other kinds of display devices, such as a head-up display or a big screen display.

Essentially, the technology disclosed in this specification has been described by way of example, and the stated content of this specification should not be interpreted as being limiting. The spirit of the technology disclosed in this specification should be determined in consideration of the claims.

Additionally, the present technology disclosed herein may also be configured as below.

(1) An image display device including:
    a display unit configured to display an image;
    an attribute information storage unit configured to store attribute information including an attribute of image display on the display unit; and
    a communication unit configured to communicate with an image output device, wherein
    the image display device transmits the attribute information to the image output device, receives an image converted by the image output device on a basis of the attribute information, and displays the received image on the display unit.

(2) The image display device according to (1), wherein
    the image display device is used by being worn on a face or head of a viewer who views the image displayed by the display unit.

(3) The image display device according to (2), wherein
the display unit includes a display panel configured to display an image and a virtual image optical unit configured to enlarge and project the image displayed on the display panel.

(4) The image display device according to (1), wherein
the attribute information storage unit stores information about a first field of view of an image to be displayed by the display unit, and
the image display device transmits the information about the first field of view to the image output device, receives an image converted by the image output device on a basis of the first field of view, and displays the received image on the display unit.

(5) The image display device according to (4), wherein
the image display device receives an image obtained by converting an original image on a side of the image output device on a basis of a difference between a second field of view of the original image and the first field of view, and displays the received image on the display unit.

(6) The image display device according to (5), wherein
when the second field of view is greater than the first field of view, the image display device receives an image obtained by the image output device cutting out a region of the first field of view from the original image, and displays the received image on the display unit.

(7) The image display device according to (5), wherein
when the first field of view is equal to or greater than the second field of view, the image display device receives the original image from the image output device, and displays the original image on the display unit.

(8) The image display device according to (5), wherein
the image display device displays an image received from the image output device on the display unit, on a basis of a relationship between the first field of view and the second field of view.

(9) The image display device according to (8), wherein
the second field of view is greater than the first field of view, and the image display device displays an image in which a region of the first field of view has been cut out from the original image on the display unit in fullscreen.

(10) The image display device according to (8), wherein
when displaying an image having the second field of view less than the first field of view on the display unit, the image display device fills in a marginal region with black or displays a wallpaper.

(11) The image display device according to (8), wherein
the image display device stretches an image having the second field of view less than the first field of view out to the first field of view, and displays the stretched image on the display unit.

(12) The image display device according to (8), wherein
when receiving an image having the second field of view less than the first field of view from the image output device, the image display device displays the image on the display unit according to a method based on an instruction from a viewer, attribution information about the viewer, or an instruction attached to the original image.

(13) An image display method including:
a step of transmitting attribute information including an attribute of image display to an image output device;
a step of receiving an image converted on a basis of the attribute information from the image output device; and a step of displaying the received image.

(14) An image output device including:
a communication unit configured to communicate with an image display device;
an image acquisition unit configured to acquire an original image to provide to the image display device; and
an image processing unit configured to process the original image, wherein
the image output device receives attribute information including an attribute of image display from the image display device, the image processing unit converts the original image on a basis of the attribute information, and the image output device transmits the converted image to the image display device.

(15) The image output device according to (14), wherein
the image output device receives information about a first field of view of an image to be displayed by the image display device, the image processing unit converts the original image on a basis of a difference between a second field of view of the original image and the first field of view, and the image output device transmits the converted image to the image display device.

(16) The image output device according to (15), wherein
when the second field of view is greater than the first field of view, the image processing unit cuts out a region of the first field of view from the original image.

(17) The image output device according to (15), wherein
when the first field of view is equal to or greater than the second field of view, the image processing unit does not perform conversion of the original image based on a difference of field of view.

(18) The image output device according to (14), wherein
the image display device stores the attribute information according to EDID or another predetermined data format, and
the image output device acquires the attribute information from the image display device via the communication unit according to a DDC or another predetermined protocol.

(19) An image output method including:
a step of acquiring an original image to provide to an image display device;
a step of receiving attribute information including an attribute of image display from the image display device;
a step of converting the original image on a basis of the attribute information; and
a step of transmitting the converted image to the image display device.

(20) An image display system including:
an image display device configured to hold attribute information including an attribute of image display; and
an image output device configured to output, to the image display device, an image converted on a basis of the attribute information acquired from the image display device.

REFERENCE SIGNS LIST

100 image display system
200 image output device
201 control unit
202 attribute information storage unit
203 image acquisition unit
204 image processing unit
205 communication unit
300 image display device
301 control unit
301A ROM
301B RAM
302 input operating unit
303 remote control receiving unit
304 status information acquisition unit
305 communication unit 306 attribute information storage unit
307 image processing unit
308 display driving unit
309 display unit
310 virtual image optical unit
311 audio processing unit
312 audio input/output unit
313 outward-facing camera

The invention claimed is:

1. An image display device comprising:
a processing device and a memory configured to store instructions which, when executed by the processing device, control:
displaying an image on a display unit of the image display device;
storing attribute information comprising a visual acuity of a user of the image display device as calculated by the image display device based on information determined from vision-correcting lenses of the user;
communicating with an image output device;
transmitting the attribute information to the image output device;
receiving an image converted from the original image by the image output device on a basis of the attribute information; and
displaying the received image on the display unit.

2. The image display device according to claim 1, wherein the image display device is used by being worn on a face or head of a viewer who views the image displayed by the display unit.

3. The image display device according to claim 2, wherein the display unit includes a display panel configured to display a given image and a virtual image optical unit configured to enlarge and project the given image displayed on the display panel.

4. The image display device according to claim 1, wherein the instructions, when executed by the processing device, control
receiving second attribute information of an original image;
determining whether a first field of view of the original image indicated in the second attribute information is greater than a second field of view of an image to be displayed by the display unit;
storing information about the second field of view of the image to be displayed by the display unit;
transmitting the information about the second field of view to the image output device; and
receiving the image converted by the image output device on a basis of the second field of view.

5. The image display device according to claim 4, wherein the image converted is obtained by converting the original image on a side of the image output device on a basis of a difference between the first field of view of the original image and the second field of view.

6. The image display device according to claim 5, wherein when the first field of view is greater than the second field of view, the image display device receives the received image obtained by the image output device cutting out a region of the second field of view from the original image.

7. The image display device according to claim 5, wherein when the second field of view is equal to or greater than the first field of view, the image display device receives the original image from the image output device, and displays the original image on the display unit.

8. The image display device according to claim 5, wherein the image display device displays a given image received from the image output device on the display unit, on a basis of a relationship between the first field of view and the second field of view.

9. The image display device according to claim 8, wherein the first field of view is greater than the second field of view, and the image display device displays an image in which a region of the second field of view has been cut out from the original image on the display unit in fullscreen.

10. The image display device according to claim 8, wherein
when displaying an image having the first field of view less than the second field of view on the display unit, the image display device fills in a marginal region with black or displays a wallpaper.

11. The image display device according to claim 8, wherein
the image display device stretches an image having the first field of view less than the second field of view out to the second field of view, and displays the stretched image on the display unit.

12. The image display device according to claim 8, wherein
when receiving the received image having the first field of view less than the second field of view from the image output device, the image display device displays the received image on the display unit according to a method based on an instruction from a viewer, attribution information about the viewer, or an instruction attached to the original image.

13. An image display method comprising:
controlling, by a processing device,
transmitting attribute information to an image output device, the attribute information comprising a visual acuity of a user of an image display as calculated by the image display based on information determined from vision-correcting lenses of the user;
receiving an image converted from the original image on a basis of the attribute information from the image output device; and
displaying the received image.

14. An image output device comprising:
a processing device and a memory configured to store instructions which, when executed by the processing device, control
communicating with an image display device;
acquiring an original image to provide to the image display device;
receiving attribute information comprising a visual acuity of a user of the image display device as calculated by the image display device based on information determined from vision-correcting lenses of the user;
converting the original image on a basis of the attribute information; and
transmitting the converted image.

15. The image output device according to claim 14, wherein
the image output device receives information about a second field of view of an image to be displayed by the image display device,
wherein the instructions, when executed by the processing device, control converting the original image on a basis of a difference between a first field of view of the original image and the second field of view.

16. The image output device according to claim 15, wherein
when the first field of view is greater than the second field of view, the instructions, when executed by the processing device, control cutting out a region of the second field of view from the original image.

17. The image output device according to claim 15, wherein
when the second field of view is equal to or greater than the first field of view, the instructions, when executed by the processing device, control not performing conversion of the original image based on a difference of field of view.

18. The image output device according to claim 14, wherein
the image display device stores the attribute information according to Extended Display Identification Data (EDID) or another predetermined data format, and
the instructions, when executed by the processing device, control acquiring the attribute information from the image display device via communication according to a Display Data Channel (DDC) or another predetermined protocol.

19. An image output method comprising:
controlling, by a processing device,
acquiring an original image to provide to an image display device;
receiving attribute information from the image display device, the attribute information comprising a visual acuity of a user of the image display device as calculated by the image display device based on information determined from vision-correcting lenses of the user;
converting the original image on a basis of the attribute information; and
transmitting the converted image to the image display device.

20. An image display system comprising:
an image display device configured to hold attribute information comprising a visual acuity of a user of the image display device as calculated by the image display device; and
an image output device configured to output, to the image display device, an image converted from an original image on a basis of the attribute information acquired from the image display device based on information determined from vision-correcting lenses of the user.

* * * * *